United States Patent
Pomish

(10) Patent No.: US 11,880,198 B2
(45) Date of Patent: Jan. 23, 2024

(54) VEHICLE ADAPTIVE CRAWL CONTROL

(71) Applicant: TOYOTA MOTOR NORTH AMERICA, INC., Plano, TX (US)

(72) Inventor: Ethan William Pomish, Livonia, MI (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 116 days.

(21) Appl. No.: 16/544,731

(22) Filed: Aug. 19, 2019

(65) Prior Publication Data

US 2021/0055728 A1    Feb. 25, 2021

(51) Int. Cl.
  *G05D 1/00* (2006.01)
  *G05D 1/02* (2020.01)
  *B60W 30/18* (2012.01)
  *B60K 6/20* (2007.10)

(52) U.S. Cl.
  CPC ..... *G05D 1/0088* (2013.01); *B60W 30/18009* (2013.01); *G05D 1/0061* (2013.01); *G05D 1/0276* (2013.01); *B60K 6/20* (2013.01); *B60W 2530/00* (2013.01); *B60W 2530/10* (2013.01); *B60Y 2200/92* (2013.01); *B60Y 2300/18008* (2013.01); *G05D 2201/0213* (2013.01)

(58) Field of Classification Search
  CPC .. G05D 1/0088; G05D 1/0061; G05D 1/0276; B60W 30/18009; B60W 2530/00; B60W 2530/10; B60Y 2300/18008
  See application file for complete search history.

(56) References Cited

U.S. PATENT DOCUMENTS

| | | | |
|---|---|---|---|
| 2016/0028824 A1* | 1/2016 | Stenneth | G08G 1/0112 709/219 |
| 2018/0111625 A1 | 4/2018 | James | |
| 2019/0024781 A1 | 1/2019 | Chrungoo | |
| 2019/0113924 A1* | 4/2019 | Falconer | B60W 60/001 |
| 2019/0135262 A1* | 5/2019 | Gaither | B60W 20/10 |
| 2021/0026348 A1* | 1/2021 | Gogna | G08G 1/0965 |

FOREIGN PATENT DOCUMENTS

| | | | |
|---|---|---|---|
| CN | 104386063 | 3/2015 | |
| KR | 20110064834 | 6/2011 | |
| WO | WO-2013056723 A1 * | 4/2013 | ........... B60W 20/00 |

OTHER PUBLICATIONS

Vincent, Isabelle, Tracked robot controllers for climbing obstacles autonomously, 2009, The International Society for Optical Engineering 7332SPIE (Year: 2009).*

* cited by examiner

*Primary Examiner* — Elaine Gort
*Assistant Examiner* — Chanmin Park
(74) *Attorney, Agent, or Firm* — SHEPPARD, MULLIN, RICHTER & HAMPTON LLP; Hector A. Agdeppa; Daniel N. Yannuzzi

(57) ABSTRACT

Systems and methods for using autonomous vehicle assistance for freeing a vehicle from a stuck condition may include: receiving sensor data from a vehicle sensor indicating a condition of the vehicle; determining from the sensor data that the vehicle is in a stuck condition; obtaining a solution for freeing the vehicle from the stuck condition, wherein the technique is a learned solution developed based on collected data related to vehicle operator techniques for extrication; and taking over at least partial control of the vehicle from its operator and applying the learned technique to the vehicle.

25 Claims, 6 Drawing Sheets

VEHICLE ADAPTIVE CRAWL CONTROL

TECHNICAL FIELD

The present disclosure relates generally to vehicle operational control, and in particular, some implementations may relate to using artificial intelligence and machine learning to identify and apply effective ways to free a stuck vehicle.

DESCRIPTION OF RELATED ART

As long as there are vehicles, there will likely be opportunities for those vehicles to become stuck. Despite the plentiful nature of paved roadways in most countries, there are still a number of roads that remain unpaved, even in countries with well-developed infrastructures. Additionally, there are a number of drivers who choose to drive off-road whether out of necessity or for recreation or pleasure. Dirt, sand, gravel, grass and other surfaces across which vehicles may be driven typically present a lower coefficient of friction to the vehicle, creating greater opportunities for the vehicle to become stuck. Additionally, the presence of rain, snow, slush, sleet and other weather elements can compound the problem. These weather elements can also create opportunities for vehicles become stuck on paved roads.

Vehicle designers have attempted to address low friction situations using vehicle systems. Some vehicles have provided a Weather Mode that can be engaged by the driver to provide better vehicle control in slippery conditions. In some instances, this mode may provide a second gear start from standstill to reduce the amount of torque applied to the drive wheels in slippery conditions. As another example, advanced all-wheel-drive systems may sense the loss of traction in one or more wheels and use torque vectoring technology to vary the torque provided to each wheel. A refinement on this is the Toyota Crawl Control™ system that uses sensor data to detect wheel slippage and uses a processor system to calculate the output for each wheel based on the detected information.

BRIEF SUMMARY OF THE DISCLOSURE

According to various embodiments of the disclosed technology a method for using autonomous vehicle assistance for freeing a vehicle from a stuck condition may include: receiving sensor data from a vehicle sensor indicating a condition of the vehicle; determining from the sensor data that the vehicle is in a stuck condition; obtaining a solution for freeing the vehicle from the stuck condition, wherein the technique is a learned solution developed based on collected data related to vehicle operator techniques for extrication; and taking over at least partial control of the vehicle from its operator and applying the learned technique to the vehicle.

The method may further include determining from the sensor data a particular type of condition in which the vehicle is stuck. Obtaining the solution for freeing the vehicle from the stuck condition may include selecting from among a plurality of solutions a tailored solution corresponding to the particular type of condition in which the vehicle is stuck.

The plurality of solutions may be developed using a trained AI model that has been trained and refined using crowd-sourced data to identify unique solutions tailored to corresponding particular types of stuck conditions.

The tailored solution may be further tailored to vehicle parameters specific to the vehicle. The in the vehicle parameters may include at least one of vehicle make and model, vehicle type, vehicle class, drive type, engine displacement, tire size, tire type, vehicle weight, gear ratios, brake horsepower, GVWR, GVM and actual vehicle weight.

Taking over at least partial control of the vehicle from its operator may include blending autonomous vehicle control with driver control to provide a blended driving mode for vehicle operation or engaging a full autonomous mode for control of the vehicle, or blending autonomous control with driver control.

A system for providing autonomous vehicle assistance to free a vehicle from a stuck condition may include: a plurality of vehicle sensors to gather data indicating a condition of the vehicle; an analysis circuit may include a receiver to receive the sensor data from the sensors, a processor, and a memory coupled to the processor to store instructions, which when executed by the processor, cause the processor to perform operations, the operations may include: determining from the sensor data whether the vehicle is in a stuck condition; and obtaining a solution for freeing the vehicle from the stuck condition, wherein the technique is a learned solution developed based on collected data related to vehicle operator techniques for extrication; and a blending system to take over at least partial control of the vehicle from its operator and apply the learned technique to the vehicle.

The blending system may include: a blend circuit to blend autonomous vehicle control with driver control; and a blend controller to control the respective amounts of autonomous vehicle control and driver control provided to the blended circuit.

The instructions may further cause the processor to perform the operation of determining from the sensor data a particular type of condition in which the vehicle is stuck.

Obtaining the solution for freeing the vehicle from the stuck condition may include selecting from among a plurality of solutions a tailored solution corresponding to the particular type of condition in which the vehicle is stuck.

A vehicle control system may include: a processor; and a memory coupled to the processor to store instructions, which when executed by the processor, cause the processor to perform operations, the operations may include: receiving sensor data from a vehicle sensor indicating a condition of the vehicle; determining from the sensor data that the vehicle is in a stuck condition; obtaining a solution for freeing the vehicle from the stuck condition, wherein the technique is a learned solution developed based on collected data related to vehicle operator techniques for extrication; and taking over at least partial control of the vehicle from its operator and applying the learned technique to the vehicle. The system may further include determining from the sensor data a particular type of condition in which the vehicle is stuck. Obtaining the solution for freeing the vehicle from the stuck condition may include selecting from among a plurality of solutions a tailored solution corresponding to the particular type of condition in which the vehicle is stuck.

The plurality of solutions in various embodiments may be developed using a trained AI model that has been trained and refined using crowd-sourced data to identify unique solutions tailored to corresponding particular types of stuck conditions.

The tailored solution in various embodiments may be further tailored to vehicle parameters specific to the vehicle. The in the vehicle parameters may include at least one of vehicle make and model, vehicle type, vehicle class, drive type, engine displacement, tire size, tire type, vehicle weight, gear ratios, brake horsepower, GVWR, GVM and actual vehicle weight.

Taking over at least partial control of the vehicle from its operator in various embodiments may include blending autonomous vehicle control with driver control to provide a blended driving mode for vehicle operation or engaging a full autonomous mode for control of the vehicle, or blending autonomous control with driver control.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the systems and methods disclosed herein can provide systems and methods for using artificial intelligence and machine learning to identify and apply effective ways to free a stuck vehicle based on how or why the vehicle is stuck. An artificial intelligence/machine learning system gathers data relating to vehicles that may get stuck (e.g., in the snow, mud, dirt, ice, and so on) and operator techniques for extricating the vehicle from this predicament. The system learns the types of behavior that are successful in extricating the vehicle from the stuck condition and can be used to help get the vehicle out of its current predicament. This can present a significant improvement over conventional systems as the vehicle can effectively learn from the experiences of its self and others the best way to extract the vehicle from a particular stuck condition, and the best-practices technique(s) for the given situation can be applied to improve the chances the vehicle was removed from the stuck condition.

The system learns problems and solutions for a number of different vehicles, vehicle types, tires, tire sizes and tire types, suspensions, ground clearances, gear ratios, throttle maps, and so on so that the solutions can be tailored to a particular vehicle and vehicle configuration. The system also learns what solutions are best for particular situations such as deep snow, mud, ice, slush, and so on, and applies those solutions for the detected situation. In some embodiments, sensor and geolocation data can be used to determine the scenario in which the vehicle is stuck. This can also present a significant improvement over conventional systems in that techniques can be learned particular to individual vehicles, vehicle types or other vehicle parameters. The specific technique for the specific vehicle in its current condition can be retrieved and applied to improve the chances vehicle can be extracted from the stuck condition.

Depending on the vehicle or the situation, the system may be configured to take full control of the vehicle, to provide driver assistance (e.g. partial, blended control of the vehicle), or to provide instructions to the driver to help free the vehicle.

Figure 1:
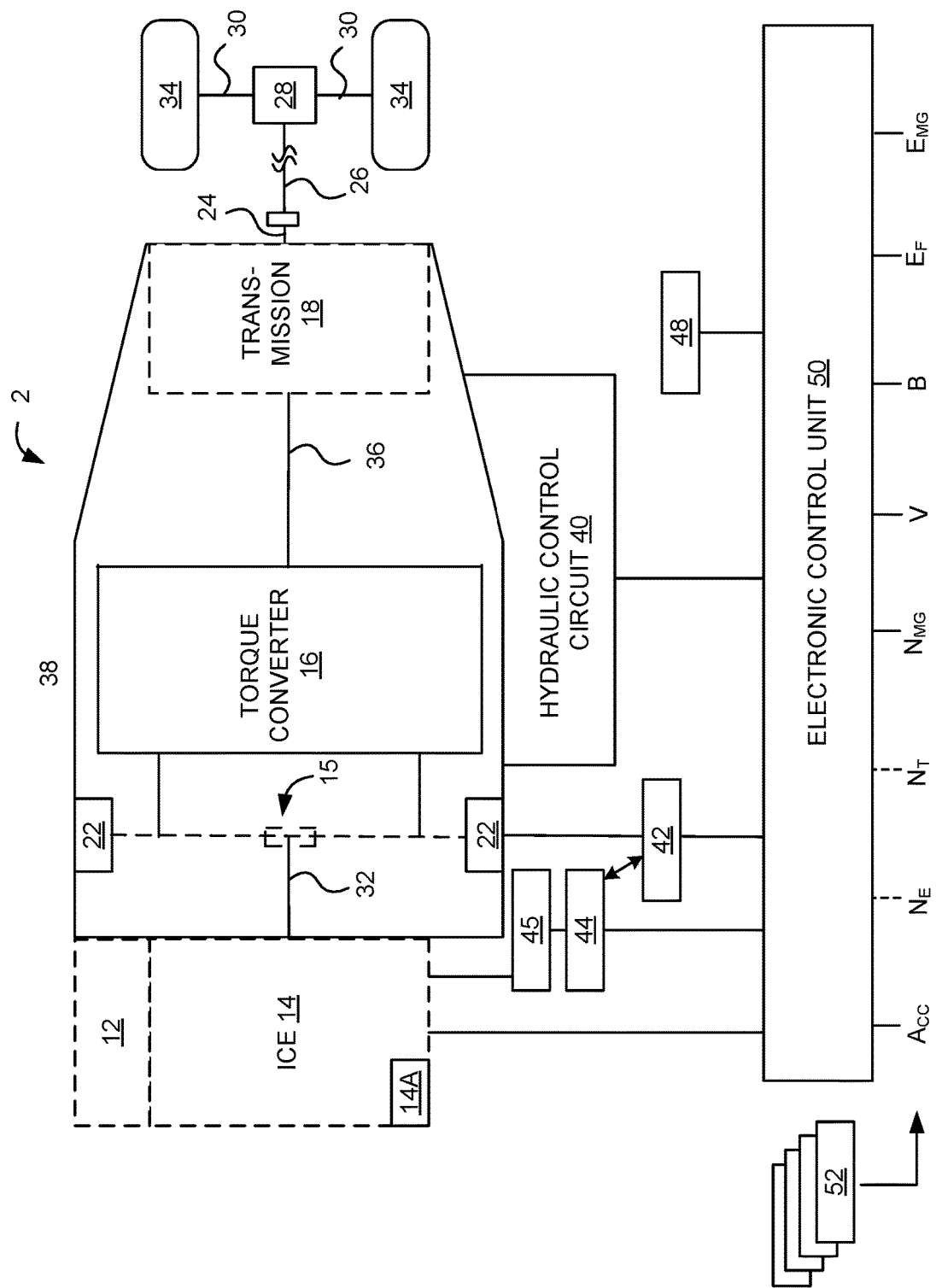
FIG. 1 is a schematic representation of an example hybrid vehicle with which embodiments of the systems and methods disclosed herein may be implemented.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for vehicle crawl control can be implemented in other types of vehicle including gasoline- or diesel-powered vehicles, fuel-cell vehicles, electric vehicles, or other vehicles.

FIG. 1 illustrates a drive system of a vehicle 102 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 102 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 102 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
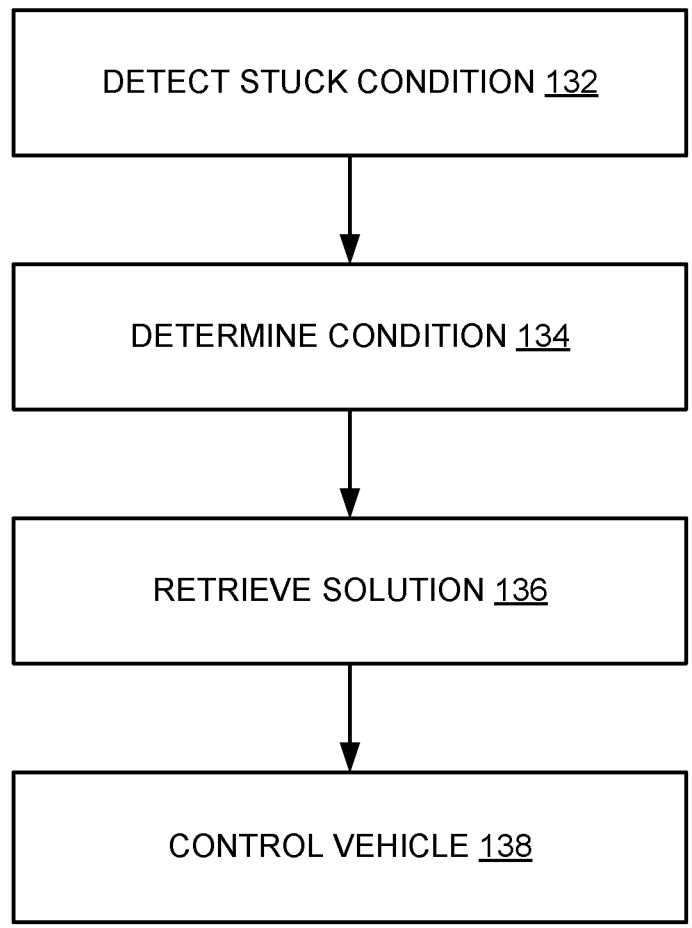
FIG. 2 illustrates an example process for vehicle crawl control in accordance with one embodiment of the systems and methods described herein.

FIG. 2 illustrates an example process for automated vehicle crawl control in accordance with one embodiment. With reference now to FIG. 2, at operation 132 the automated crawl control system detects that the vehicle has become stuck. For example, the system can receive and evaluate data from various sensors such as wheel spin sensors, throttle position sensors, position determination systems, and so on to determine whether the vehicle is in a stuck condition. In various embodiments, artificial intelligence and machine learning techniques can be used to detect stuck conditions. For example, various different combinations of input data can be evaluated over a number of different experiences to train a model that can be used to detect stuck conditions. Various combinations of conditions along with the results (i.e. in the vehicle get stuck) can be used to train the AI model. Actual experiences for the particular vehicle or across many different vehicles can be used to further refine the AI model.

If the vehicle is stuck, at operation 134 the system can determine the particular condition facing the vehicle. For example, the system can be configured to determine whether the vehicle is stuck in sand, mud or snow, or whether the vehicle is hung up on a rock or other obstruction, or some other stuck condition. In some instances, this can be detected based on vehicle system and sensor data such as, for example, weather data (e.g., external temperature, precipitation, etc.), vehicle position data (e.g., the vehicle is on a beach, in a rocky area, in a cold climate, etc.), wheel spin data, and so on. The system may also use sensor data to determine how badly the vehicle is stuck (e.g., how deep is the rut in which a tire is sunk, etc.).

At operation 136, the system retrieves a solution to remove the vehicle from the stuck condition. In some circumstances, the solution retrieves may be a specific solution that corresponds to the determined stuck condition. For example, freeing a vehicle that is stuck in snow may require a different technique as compared to frame a vehicle that is stuck in sand, or hung up on an obstacle. Different throttle inputs, levels of torque, suspension settings, rocking techniques, or other settings or methods may be required for different circumstances. The system can be configured to use artificial intelligence and machine learning to learn which techniques, settings and methods (i.e., which solution) is best for the given situation. Experiences from the vehicle itself as well as crowd-sourced experiences from other users or other vehicles can be collected and evaluated to train models used to develop and refine solutions. For example, sensors on vehicles can be used to log data indicating different stuck conditions and vehicle parameters, and driver techniques used to free the vehicle and their levels of success can be collected. The can be collected from the subject vehicle as well as crowd-sourced from other vehicles as well. These gathered data elements can be used to train and refine the AI model used to identify solutions for stuck vehicles. Data for particular locations can be collected as well such that location-specific solutions may also be developed. In other words, the system can gather data from other vehicles that encountered similar conditions at a given or similar location and learn which solutions were effective for a given location. The system may further track location-based conditions and solutions based on date and time of occurrence.

Results of different solutions can be evaluated to further refine the models to more ideally identify a corresponding solution to a particular stuck condition. The solution may also be dependent on other vehicle parameters such as, for example, vehicle make and model, vehicle type, vehicle class, drive type (e.g., FWD, 4×4, RWD, etc.), engine displacement (e.g., front, mid, rear, etc.) tire size and type (e.g., all season, winter, mud and snow, summer, and so on), vehicle weight, vehicle torque, gear ratios, brake horsepower, GVWR or GVM, actual vehicle weight, and so on. Accordingly, the system can use this information to better identify solutions that work for particular vehicles in particular stuck conditions.

At operation 138, with the appropriate vehicle solution retrieved, the vehicle control system can take over partial or complete control of the vehicle to attempt to free the vehicle from the stuck condition. In some implementations, full autonomous control of the vehicle can be given over to the crawl control system to allow the system to operate the vehicle to free the vehicle. For example, the system may determine how to vector the torque among the drive wheels, how much torque to apply to each drive wheel, which drive gear (e.g., D1, D2, D3, etc. or reverse), when to adjust these and other settings, and so on, to improve the chances of freeing the vehicle. For example, the system may determine the best settings to be applied in the exact times to apply the settings to most effectively rock a vehicle out of a rut. Appropriate timing of gear shifts from forward to reverse can maximize the momentum of the vehicle during this rocking motion. Likewise, the appropriate application of torque to the drive wheels can improve the effectiveness of the vehicle rocking.

Figure 3:
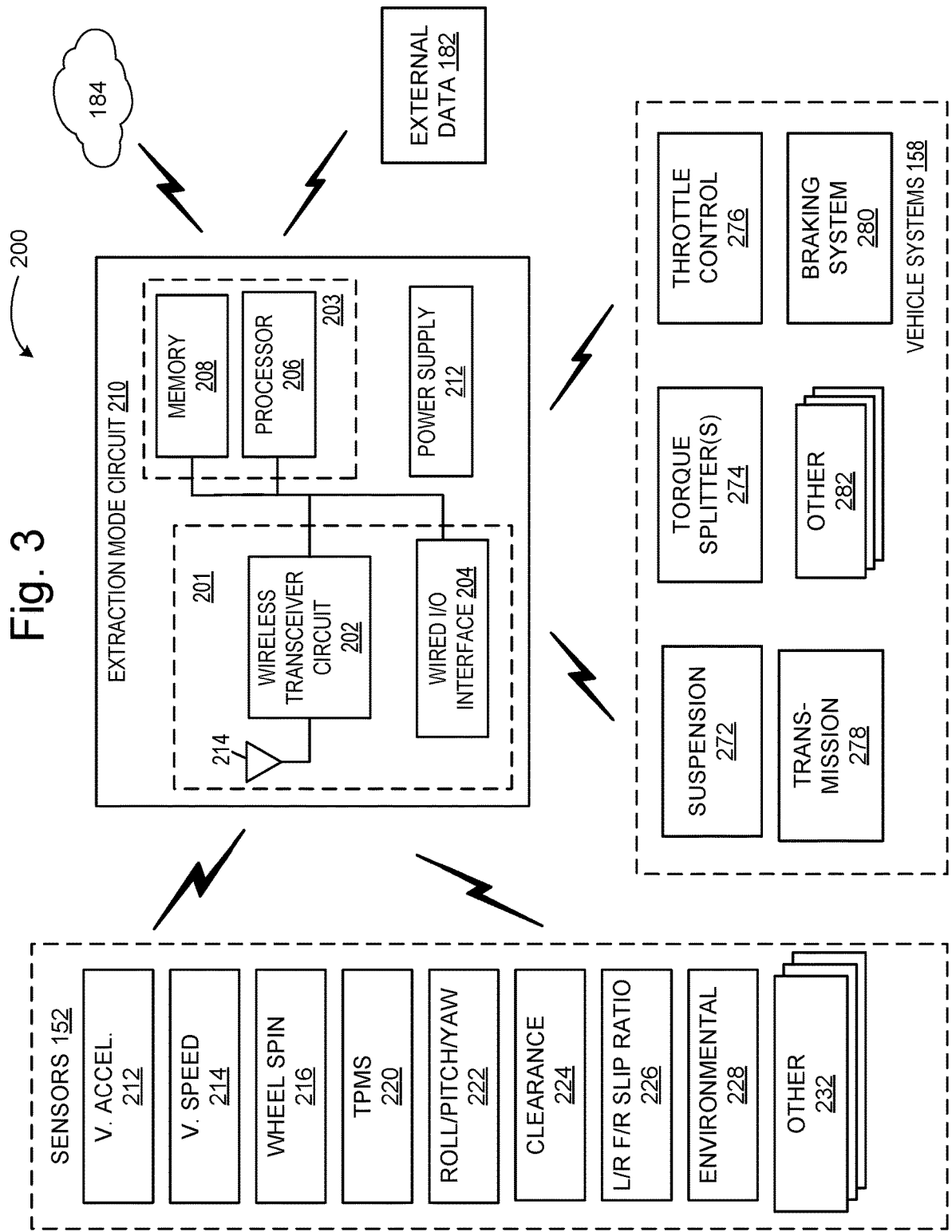
FIG. 3 illustrates an example architecture for a vehicle crawl control system in accordance with one embodiment of the systems and methods described herein.

FIG. 3 illustrates an example architecture for detecting possible slippage and entering an crawl mode in accordance with one embodiment of the systems and methods described herein. Referring now to FIG. 3, in this example, crawl mode system 200 includes an extraction mode circuit 210, a plurality of sensors 152 and a plurality of vehicle systems 158. Sensors 152 and vehicle systems 158 can communicate with extraction mode circuit 210 via a wired or wireless communication interface. Although sensors 152 and vehicle systems 158 are depicted as communicating with extraction mode circuit 210, they can also communicate with each other as well as with other vehicle systems. This example also illustrates that the crawl mode system can communicate with external data sources 182 and a cloud server or other remote server 184. External data sources 182 can include, for example, other vehicles, infrastructure elements, data services, or other sources for data from external to the vehicle.

Assist-mode detection/activation circuit 210 can be implemented as an ECU or as part of an ECU such as, for example electronic control unit 50. In other embodiments, extraction mode circuit 210 can be implemented independently of the ECU. Extraction mode circuit 210 in this example includes a communication circuit 201, a decision circuit 203 (including a processor 206 and memory 208 in this example) and a power supply 212. Components of extraction mode circuit 210 are illustrated as communicating with each other via a data bus, although other communication in interfaces can be included. Although not illustrated in this example, in some embodiments extraction mode circuit 210 may include a switch or other user interface function to allow a vehicle operator to manually enable or disable the vehicle extraction mode.

Processor 206 can include one or more GPUs, CPUs, microprocessors, or any other suitable processing system. Processor 206 may include a single core or multicore processors. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to extraction mode circuit 210.

Although the example of FIG. 3 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a extraction mode circuit 210.

Communication circuit 201 either or both a wireless transceiver circuit 202 with an associated antenna 214 and a wired I/O interface 204 with an associated hardwired data port (not illustrated). As this example illustrates, communications with extraction mode circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by extraction mode circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and $NiH_2$, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 152 can include additional sensors that may or not otherwise be included on a standard vehicle 10 with which the vehicle crawl mode system 200 is implemented. In the illustrated example, sensors 152 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect temperature, moisture, weather or other environmental conditions). Additional sensors 232 can also be included as may be appropriate for a given implementation of crawl mode system 200. These might include, for example, radar, lidar, infrared or other distance measurement sensors to detect distances to objects external to the vehicle, the GPS system to determine vehicle position, and so on.

Vehicle systems 158 can include any of a number of different vehicle components or subsystems used to control or monitor various aspects of the vehicle and its performance. In this example, the vehicle systems 158 include an adjustable vehicle suspension system 272 (e.g., capable of raising and lowering vehicle ride height); torque splitters 274 that can control distribution of power among the vehicle wheels such as, for example, by controlling front/rear and left/right torque split; throttle control circuits 276 to control the vehicle throttle; transmission 278 to; braking system 280; and other vehicle systems (e.g. Internal combustion engine, steering system to provide steering input to the vehicle, etc.).

During operation, extraction mode circuit 210 can receive information from various vehicle sensors to determine whether the vehicle is in a stuck condition and the crawl mode should be activated. Also, the driver may manually activate the crawl mode. Communication circuit 201 can be used to transmit and receive information between extraction mode circuit 210 and sensors 152, and extraction mode circuit 210 and vehicle systems 158. Also, sensors 152 may communicate with vehicle systems 158 directly or indirectly (e.g., via communication circuit 201 or otherwise).

In various embodiments, communication circuit 201 can be configured to receive data and other information from sensors 152 that is used in determining whether to activate the crawl mode. Additionally, communication circuit 201 can be used to send an activation signal or other activation information to actuators of various vehicle systems 158 as part of entering the crawl mode. For example, as described in more detail below, communication circuit 210 can be used to send signals to one or more of: suspension system 272 to raise or lower the vehicle as may be appropriate; torque splitters 274 to control front/rear torque split and left/right torque split to apply torque to wheels with greater traction; throttle control 276 to, for example, control the amount of power supplied to avoid wheelspin or to adjust throttle mapping; transmission 278 to, for example, select the gear for vehicle operation rock the vehicle, or to avoid applying too much torque to the drive wheels; braking system 280 to, for example, brake the vehicle The decision regarding what action to take via these various vehicle systems 158 can be made based on the information detected by sensors 152 and provided to extraction mode circuit 210. Examples of this are described in more detail below.

Figure 4:
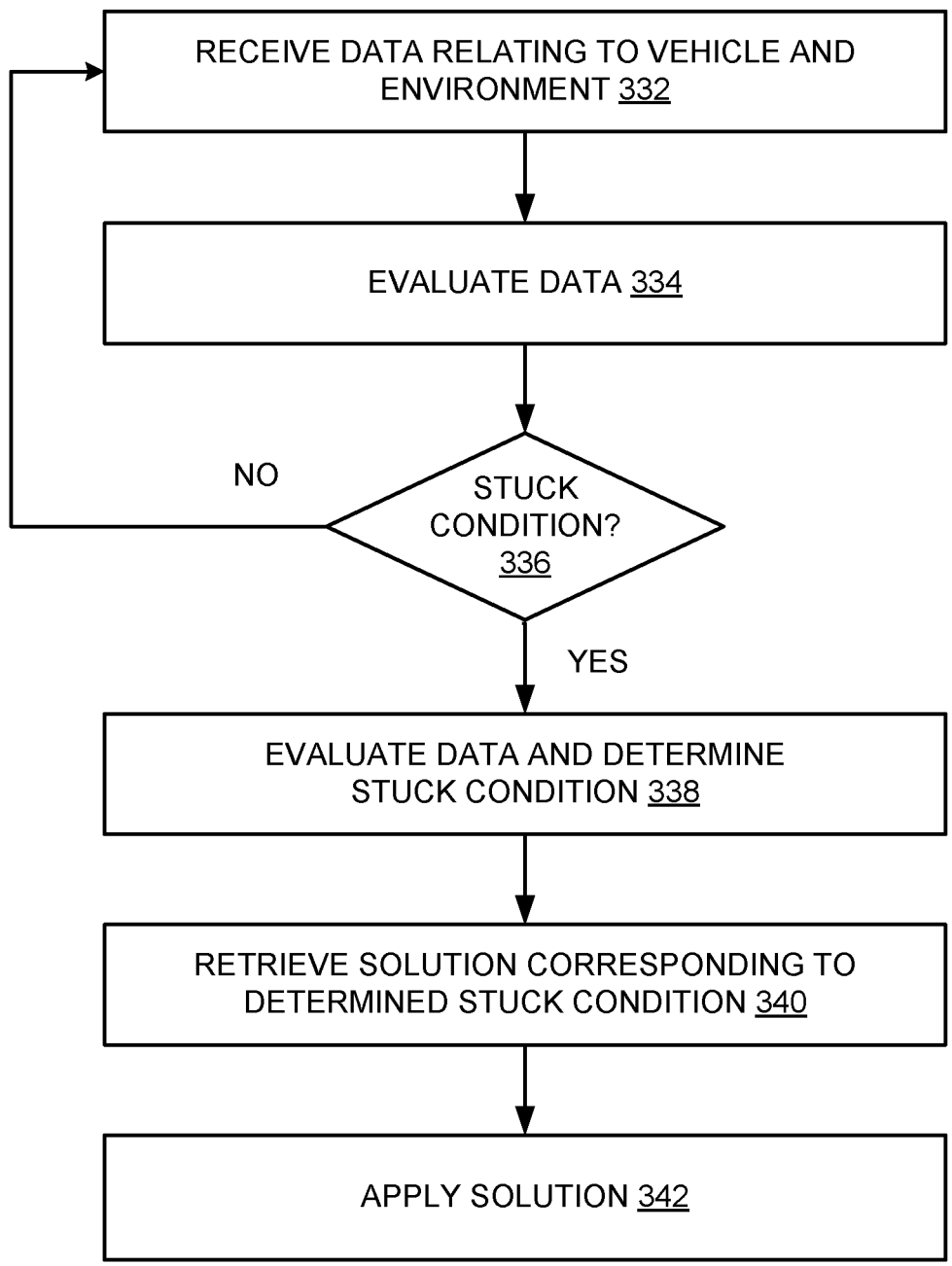
FIG. 4 illustrates another example process for vehicle crawl control in accordance with one embodiment of the systems and methods described herein.
Figure 5:
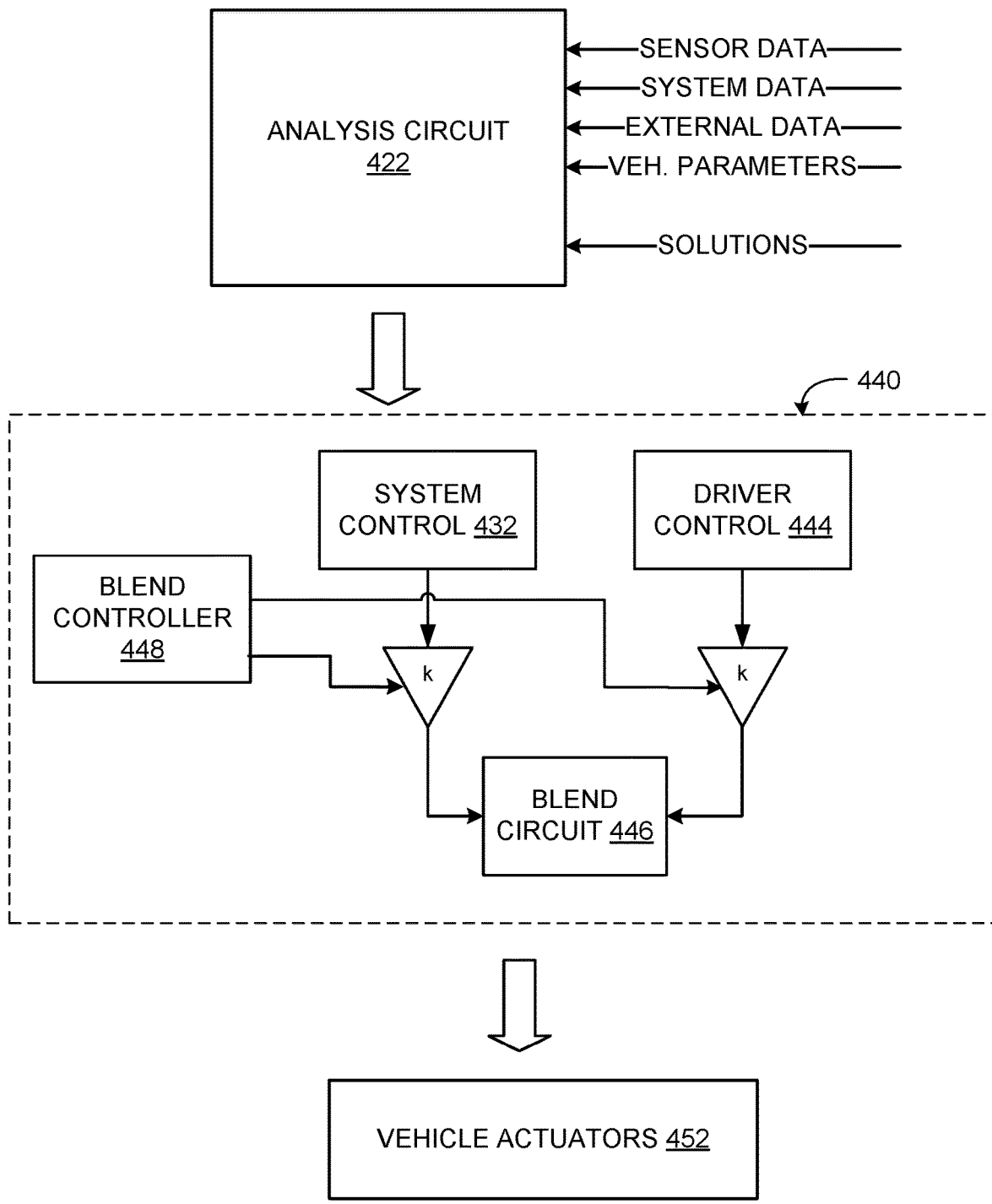
FIG. 5 illustrates an example system for vehicle crawl control system in accordance with one embodiment of the systems and methods described herein.

FIG. 4 illustrates another example process for freeing a stuck vehicle in accordance with embodiments of the systems and methods disclosed herein. FIG. 5 illustrates an example system architecture for a crawl control system in accordance with embodiments of the systems and methods disclosed herein. With reference now to FIGS. 4 and 5.

In this example, at operation 332, analysis circuit 422 receives data relating to the vehicle and the environment. For example, in the context of FIG. 3, extraction mode circuit 210 may receive data from one or more of sensors 152, vehicle systems 158, external data 182 and cloud 184. In the example of FIG. 5 the system receives not only sensor data, system data and external data, but also receives additional information such as vehicle parameters and potential solutions. Vehicle parameters may include vehicle parameters such as, for example, vehicle make and model, vehicle type, vehicle class, drive type (e.g., FWD, 4×4, RWD, etc.), engine displacement (e.g., front, mid, rear, etc.) tire size and type (e.g., all season, winter, mud and snow, summer, and so on), vehicle weight, vehicle torque, gear ratios, brake horsepower, GVWR or GVM, actual vehicle weight, and so on.

At operation 334, analysis circuit 422 extraction mode circuit (e.g., extraction mode circuit 210) evaluates the received data and vehicle parameters to determine whether the vehicle is in a stuck condition. For example, the detection of excessive wheelspin, large throttle inputs without vehicle movement, rocking back and forth of the vehicle, and someone may indicate that the vehicle is in a stuck condition. Additionally, in some embodiments, the user may manually indicate (e.g., through a URI) that the vehicle is stuck. If the vehicle is not stuck, the system continues to receive and evaluate data. This is illustrated operation 336.

On the other hand, if the system determines that the vehicle is stuck at operation 336, the process continues at operation 338 were the system evaluates the data to determine the particular conditions under which the vehicle is stuck. For example, location data, weather data, other environment data, and other data can be used to classify the manner in which the vehicle is stuck. Excessive wheelspin (e.g., indicated by data from a wheelspin sensor) in a northern climate (e.g., indicated by a position determination system) where the weather data indicates snowy conditions can lead to the determination that the vehicle is stuck in slush or snow. On the other hand, excessive wheelspin a warm climate close to the ocean may indicate that the vehicle is stuck in the sand. As yet another example, accelerometer data indicating that the vehicle is teetering along with location data indicating that the vehicle is in a rocky environment may indicate that the vehicle is hung up on a rock.

At operation 340, the system retrieves a solution that corresponds to the determined stuck condition. For example, the vehicle may have access to a number of extraction solutions stored locally on the vehicle or stored remotely such as on a cloud server. Different solutions may be tailored to correspond to different stuck conditions. For example, if a vehicle is stuck in typical snow or sand conditions, the solution may be to adjust the steering so the wheels are straight into rock the vehicle backward and forward by alternating between forward and reverse gears, building and using momentum of the vehicle to remove the vehicle from its stuck condition. The solution may also include driver instructions that can be communicated to the driver such as, for example, via the head unit in audible or visual form. The instructions may include, for example, to remove excess snow to clear a path for the vehicle, sprinkle kitty litter or sand in snowy ruts to provide traction for the vehicle and so on. These instructions can include physical steps to increase the chances that the vehicle can be driven out of the stuck condition. In another example, the instructions can further tell the driver how to operate the vehicle themselves to free the vehicle.

At operation 342, the system applies determine the solution to the stuck vehicle. In some embodiments, this can be implemented as the vehicle operating in an autonomous mode without driver input to attempt to free the vehicle, the vehicle operating in a non-autonomous mode to allow a human operator to follow instructions provided by the system to attempt to free the vehicle, or a combination of the two in which automated control is blended with driver control in a determined ratio to attempt to free the vehicle.

In the example of FIG. 5, automated system control 432 can be blended with driver control 444 in a blend circuit 446 of a blending system 440 to control the vehicle. The output of blend circuit 446 controls vehicle actuators 452 to operate the vehicle. This can include, for example, actuators to control throttle application, brake application, gear selection, suspension height, and so on. A blend controller 448 can be used to control the extent to which automated control (by a system control 432) is blended with manual driver control 444 to control the vehicle. Blend controller 132 can provide signals to adjust the amount of gain in the system control signals and driver control signals before they are blended by blend circuit 446. Blend controller 132 can also effectively turn off signals from driver control 444 or system control 432 to allow the vehicle to be controlled in a 100% autonomous mode or a 100% manual mode. Any level of blending in between these two extremes can be achieved using this system.

Analysis circuit 422 may be implemented on board the vehicle (e.g., extraction mode circuit 210), via a cloud server or other remote server, or utilizing edge computing across a number of vehicles or other computing resources. Blending system 440 may also be implemented on board the vehicle, and implanted circuit 446 and blend controller 448 may be implemented as independent circuits or as part of analysis circuit 422.

Figure 6:
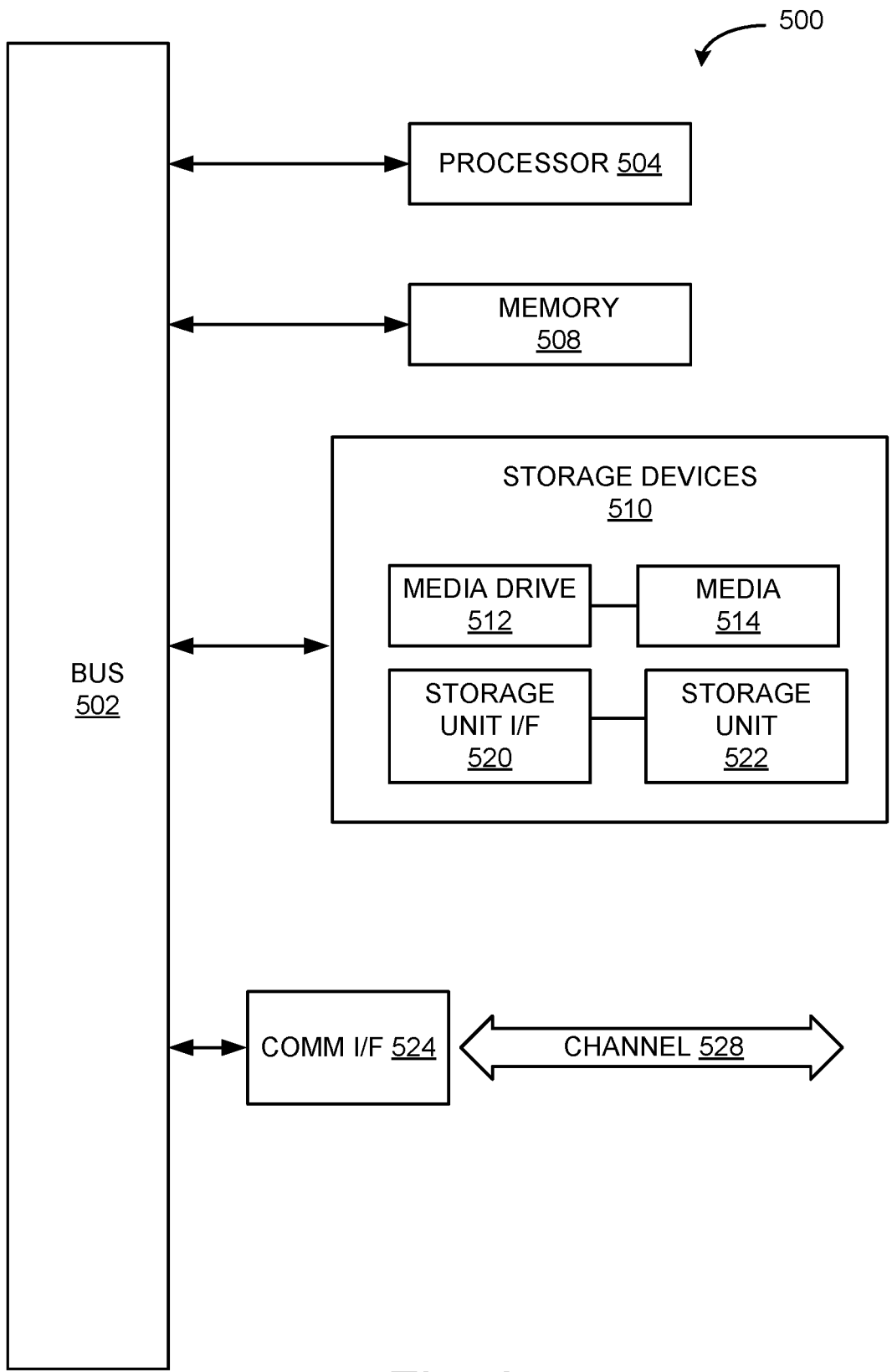
FIG. 6 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 500. After reading this description, it will become apparent to a person skilled in the relevant art how to implement the application using other computing components or architectures.

Referring now to FIG. 6, computing component 500 may represent, for example, computing or processing capabilities found within a self-adjusting display, desktop, laptop, notebook, and tablet computers. They may be found in hand-held computing devices (tablets, PDAs, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for using autonomous vehicle assistance for freeing a vehicle from a stuck condition, comprising:
   receiving sensor data from a vehicle sensor indicating a condition of the vehicle, wherein the sensor data comprises throttle data associated with a throttle control circuit of the vehicle and vehicle movement data associated with a position determination system of the vehicle;
   when the throttle data identifies application of a throttle and the vehicle movement data identifies no forward or backward movement of the vehicle, determining from the sensor data that the vehicle is in the stuck condition;
   obtaining a learned solution for freeing the vehicle from the stuck condition, the learned solution comprising a vehicle extrication technique output from a machine learning algorithm trained using data from at least one previously employed vehicle extrication technique and comprises a level of successful vehicle extrication of the at least one previously employed vehicle extrication technique; and
   taking over at least partial control of the vehicle from its operator and applying the learned solution to the vehicle to extricate the vehicle from the stuck condition, wherein application of the learned solution operates the vehicle to rock the vehicle from the stuck condition using timing of gear shifts or an adjusted application of torque to drive wheels of the vehicle.

2. The method of claim 1, further comprising determining from the sensor data a particular type of condition in which the vehicle is stuck.

3. The method of claim 2, wherein obtaining the learned solution for freeing the vehicle from the stuck condition comprises selecting from among a plurality of solutions, a tailored solution corresponding to the particular type of condition in which the vehicle is stuck.

4. The method of claim 3, wherein the plurality of solutions are developed using a trained AI model that has been trained and refined using crowd-sourced data to identify unique solutions tailored to corresponding particular types of stuck conditions.

5. The method of claim 3, wherein the tailored solution is further tailored to vehicle parameters specific to the vehicle.

6. The method of claim 5, where in the vehicle parameters comprise at least one of vehicle make and model, vehicle type, vehicle class, drive type, engine displacement, tire size, tire type, vehicle weight, gear ratios, brake horsepower, GVWR, GVM and actual vehicle weight.

7. The method of claim 1, wherein taking over at least partial control of the vehicle from its operator comprises blending autonomous vehicle control with driver control to provide a blended driving mode for vehicle operation.

8. The method of claim 1, wherein taking over at least partial control of the vehicle from its operator comprises engaging a full autonomous mode for control of the vehicle.

9. The method of claim 1, wherein taking over at least partial control of the vehicle from its operator comprises blending autonomous control with driver control.

10. A system for providing autonomous vehicle assistance to free a vehicle from a stuck condition, comprising:
    a plurality of vehicle sensors to gather sensor data indicating a condition of the vehicle, wherein the sensor data comprises throttle data associated with a throttle control circuit of the vehicle and vehicle movement data associated with a position determination system of the vehicle;
    an analysis circuit comprising a receiver to receive the sensor data from the plurality of vehicle sensors, a processor, and a memory coupled to the processor to store instructions, which when executed by the processor, cause the processor to perform operations, the operations comprising:
      when the throttle data identifies application of a throttle and the vehicle movement data identifies no forward or backward movement of the vehicle, determining from the sensor data that the vehicle is in the stuck condition; and
      obtaining a learned solution for freeing the vehicle from the stuck condition, the learned solution comprising a vehicle extrication technique output from a machine learning algorithm trained using data from at least one previously employed vehicle extrication technique and comprises a level of successful vehicle extrication of the at least one previously employed vehicle extrication technique; and
    a blending system to:
      take over at least partial control of the vehicle from its operator; and
      apply the learned solution to the vehicle to extricate the vehicle from the stuck condition.

11. The system of claim 10, wherein the blending system comprises:
    a blend circuit to blend autonomous vehicle control with driver control; and a blend controller to control respective amounts of autonomous vehicle control and driver control provided to the blend circuit.

12. The system of claim 10, wherein taking over at least partial control of the vehicle from its operator comprises engaging a full autonomous mode for control of the vehicle.

13. The system of claim 10, wherein taking over at least partial control of the vehicle from its operator comprises blending autonomous control with driver control.

14. The system of claim 10, wherein the instructions further cause the processor to perform the operations of determining from the sensor data a particular type of condition in which the vehicle is stuck.

15. The system of claim 14, wherein obtaining the learned solution for freeing the vehicle from the stuck condition comprises selecting from among a plurality of solutions, a tailored solution corresponding to the particular type of condition in which the vehicle is stuck.

16. The system of claim 15, wherein the plurality of solutions are developed using a trained AI model that has been trained and refined using crowd sourced data to identify unique solutions tailored to corresponding particular types of stuck conditions.

17. The system of claim 15, wherein the tailored solution is further tailored to vehicle parameters specific to the vehicle.

18. A vehicle control system, comprising:
a processor; and
a memory coupled to the processor to store instructions, which when executed by the processor, cause the processor to perform operations, the operations comprising:
receiving sensor data from one or more vehicle sensors indicating a condition of a vehicle, wherein the sensor data comprises throttle data associated with a throttle control circuit of the vehicle and vehicle movement data associated with a position determination system of the vehicle;
when the throttle data identifies application of a throttle and the vehicle movement data identifies no forward or backward movement of the vehicle, determining from the sensor data that the vehicle is in a stuck condition;
obtaining a learned solution for freeing the vehicle from the stuck condition, the learned solution comprising a vehicle extrication technique output from a machine learning algorithm trained using data from at least one previously employed vehicle extrication technique and comprises a level of successful vehicle extrication of the at least one previously employed vehicle extrication technique; and
taking over at least partial control of the vehicle from its operator and applying the learned solution to the vehicle to extricate the vehicle from the stuck condition, wherein application of the learned solution automatically adjusts vehicle operation in accordance with environmental conditions in the sensor data that caused the vehicle to be in the stuck condition.

19. The vehicle control system of claim 18, further comprising determining from the sensor data a particular type of condition in which the vehicle is stuck.

20. The vehicle control system of claim 19, wherein obtaining the learned solution for freeing the vehicle from the stuck condition comprises selecting from among a plurality of solutions, a tailored solution corresponding to the particular type of condition in which the vehicle is stuck.

21. The vehicle control system of claim 20, wherein the plurality of solutions are developed using a trained AI model that has been trained and refined using crowd sourced data to identify unique solutions tailored to corresponding particular types of stuck conditions.

22. The vehicle control system of claim 20, wherein the tailored solution is further tailored to vehicle parameters specific to the vehicle.

23. The vehicle control system of claim 22, where in the vehicle parameters comprise at least one of vehicle make and model, vehicle type, vehicle class, drive type, engine displacement, tire size, tire type, vehicle weight, gear ratios, brake horsepower, GVWR, GVM and actual vehicle weight.

24. The vehicle control system of claim 18, wherein taking over at least partial control of the vehicle from its operator comprises blending autonomous vehicle control with driver control to provide a blended driving mode for the vehicle operation.

25. The vehicle control system of claim 18, wherein taking over at least partial control of the vehicle from its operator comprises engaging a full autonomous mode for control of the vehicle or blending autonomous control with driver control.

* * * * *